US009485729B2

(12) United States Patent
Cheng et al.

(10) Patent No.: US 9,485,729 B2
(45) Date of Patent: Nov. 1, 2016

(54) SELECTING A TRANSMISSION POLICY AND TRANSMITTING INFORMATION TO A WEARABLE DEVICE

(71) Applicant: Samsung Electronics Co. Ltd., Suwon-si, Gyeonggi-do (KR)

(72) Inventors: Allen Chao-Hung Cheng, Dublin, CA (US); Eui Suk Chung, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 13/966,662

(22) Filed: Aug. 14, 2013

(65) Prior Publication Data

US 2015/0049657 A1    Feb. 19, 2015

(51) Int. Cl.
*H04W 72/00* (2009.01)
*H04B 1/3827* (2015.01)
*H04W 52/02* (2009.01)
*H04W 4/00* (2009.01)
*H04W 72/04* (2009.01)
*H04W 88/06* (2009.01)

(52) U.S. Cl.
CPC ......... *H04W 52/0212* (2013.01); *H04W 4/008* (2013.01); *H04W 52/028* (2013.01); *H04W 72/0493* (2013.01); *H04B 2001/3866* (2013.01); *H04W 88/06* (2013.01); *Y02B 60/50* (2013.01)

(58) Field of Classification Search
CPC ............... H04W 52/0212; H04W 72/0493; H04W 88/06; H04W 52/028; Y02B 60/50; H04B 1/385; H04B 2001/3866
See application file for complete search history.

(56) References Cited

U.S. PATENT DOCUMENTS 7,492,760 B1 *  2/2009  Plante et al. .................. 370/363
2004/0266493 A1  12/2004  Bahl et al.
2005/0245292 A1  11/2005  Bennett et al.
2005/0249227 A1  11/2005  Wang et al.
2006/0013176 A1   1/2006  De Vos et al.
2006/0262759 A1 * 11/2006  Bahl et al. .................... 370/338
2007/0121860 A1 *  5/2007  Liang .................... H04M 1/723
                                                              379/158
2007/0195724 A1 *  8/2007  Yang et al. .................... 370/321
2008/0279130 A1  11/2008  Lewis
2008/0279138 A1  11/2008  Gonikberg et al.
2009/0196210 A1   8/2009  Desai
2010/0020820 A1 *  1/2010  Jones ............................ 370/465
2010/0069007 A1 *  3/2010  Nagasawa ........... H04M 1/6066
                                                              455/41.3
2014/0286178 A1 *  9/2014  Roy .............................. 370/252

FOREIGN PATENT DOCUMENTS

WO    2013/070232 A1    5/2013

OTHER PUBLICATIONS

Controller|Define Controller at Dictionary.com. Dictionary.com. [retrieved on Sep. 17, 2015]. Retrieved from the Internet <URL: http://dictionary.reference.com/browse/controller?s=t>. pp. 1.*

* cited by examiner

*Primary Examiner* — Omar Ghowrwal
(74) *Attorney, Agent, or Firm* — Jefferson IP Law, LLP

(57) ABSTRACT

A system, apparatus, and method for communicating with a wearable wireless device are provided. The system includes at least one data source, an aggregator configured to receive data from the at least one data source, and to communicate with an access point, the access point configured to communicate with the aggregator and to communicate with a wearable wireless device, and the wearable wireless device configured to communicate with the access point so as to receive information from the aggregator through the access point.

26 Claims, 7 Drawing Sheets

SELECTING A TRANSMISSION POLICY AND TRANSMITTING INFORMATION TO A WEARABLE DEVICE

TECHNICAL FIELD

The present disclosure relates to an apparatus, method, and system for low power wearable devices. More particularly, the present invention relates to an apparatus, method, and system for communicating with a wearable device using a low-powered communication protocol for non data-intensive information.

BACKGROUND

Wearable wireless devices are developed to simultaneously provide wireless communication between users and a convenience associated with the wireless being wearable and thus highly mobile.

According to the related art, wearable wireless devices utilize higher power wireless networks such as Bluetooth (BT), WIFI, 2G or 3G to transmit and receive cellular and internet data. As a result, the wearable wireless devices tend to have insufficiently short device use time between battery recharges.

Wearable wireless devices may incorporate lower power wireless network technologies such as Bluetooth Low Energy (BTLE). However, such wearable wireless devices suffer from a loss of important functionality (e.g., no voice call capability) due to lack of protocol support for data-intensive communication in BTLE single mode devices, and/or a loss of energy efficiency via BT/BTLE dual mode devices as BT/BTLE implementation according to the related art requires two devices equipped with dual mode devices to communicate using the higher power BT protocol. In addition, BT/BTLE dual mode devices do not support concurrent connection supporting both BT and BTLE protocols simultaneously. Consequently, wearable wireless devices suffer from a relatively short battery life, and excessive apparatus volume as device manufacturers design such wearable wireless devices to include increasingly large/oversized batteries to compensate for the relatively short battery life.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for communicating with a wearable wireless device.

In accordance with an aspect of the present disclosure, a method for operating an aggregator to transmit information to a user is provided. The method includes receiving information from at least one data source, selecting a transmission policy according to which the information is to be transmitted to a user, and transmitting the information to the user according to the selected transmission policy.

In accordance with another aspect of the present disclosure, an apparatus for transmitting information to a user is provided. The apparatus includes a communication unit configured to receive information from at least one data source, and to transmit the received information to the user, a storage unit configured to store the received information, and a control unit configured to select a transmission policy according to which the information is to be transmitted to a user, and to operatively control the communication unit to transmit the information to the user according to the selected transmission policy.

In accordance with an aspect of the present disclosure, a method for operating a wearable wireless device is provided. The method includes entering a power saving mode, powering on a low power communication unit while maintaining other non-essential units in the wearable wireless device in a power saving state, transmitting an inquiry to an access point inquiring whether the access point has information to transmit to the wearable wireless device, if the access point does not have information to transmit to the wearable wireless device, setting the low power communication unit to the power saving state; and if the access point has information to transmit to the wearable wireless device, exiting the power saving mode and communicating with the access point using one or more communication protocols.

In accordance with another aspect of the present disclosure, a wearable wireless device is provided. The wearable wireless device includes a storage unit configured to store information, a display unit configured to display a user interface with which a user may view information, a communication unit configured to wirelessly communicate with an access point, the communication unit including a lower power communication unit, and a control unit configured to control the wearable wireless device to enter a power saving mode when the wearable wireless device is not communicating with the access point, to power on the low power communication unit while maintaining other non-essential units in the wearable wireless device in a power saving state, to transmit an inquiry to the access point inquiring whether the access point has information to transmit to the wearable wireless device, to setting the lower power communication unit to the power saving state if the access point does not have information to transmit to the wearable wireless device, and to exit the power saving mode and communicate with the access point using one or more communication protocols if the access point has information to transmit to the wearable wireless device.

In accordance with another aspect of the present disclosure, a system for communicating with a wearable wireless device is provided. The system includes at least one data source, an aggregator configured to receive data from the at least one data source, and to communicate with an access point, the access point configured to communicate with the aggregator and to communicate with a wearable wireless device, the wearable wireless device configured to communicate with the access point so as to receive information from the aggregator through the access point.

In accordance with another aspect of the present disclosure, an access point is provided. The access point includes a communication unit configured to communicate with an aggregator and configured to communicate with a wearable wireless device, a storage unit configured to store information received from at least one of the aggregator and the wearable wireless device, and a control unit configured to communicate with the wearable wireless device using a combination of communication links according to a transmission policy.

In accordance with another aspect of the present disclosure, a method for operating an access point is provided. The method includes receiving information from an aggregator, receiving an inquiry from a wearable wireless device inquiring whether the access point has information to transmit to the wearable wireless device, transmitting a response to the inquiry from the wearable wireless device, and if the access point has information to transmit to the wearable wireless device, communicating the information to the wearable wireless device using one or more communication protocols.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
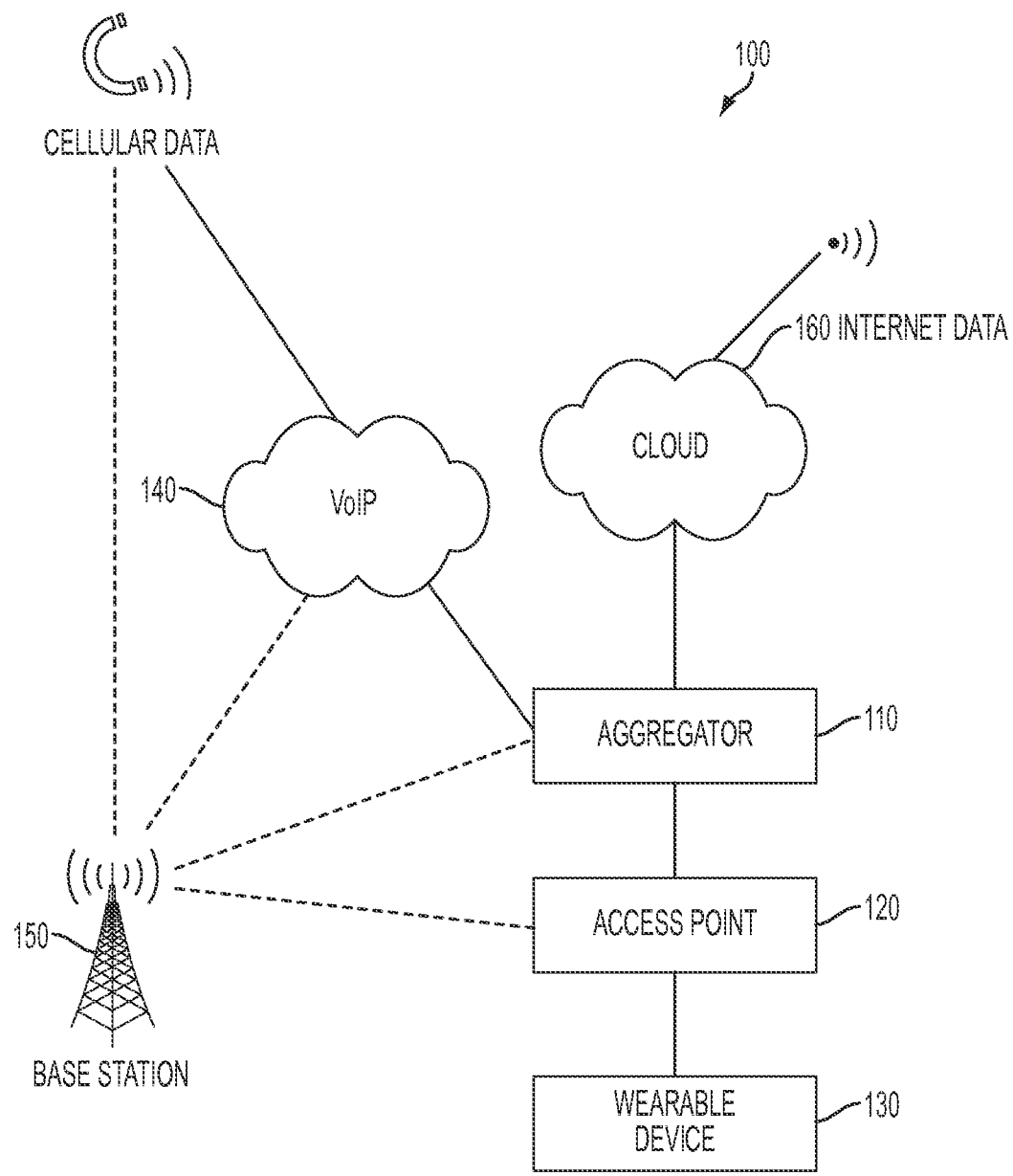
FIG. 1 is a diagram illustrating a system architecture for providing low power communication with a wearable device according to an exemplary embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure include an apparatus, method, and system for low power wearable wireless devices.

According to various embodiments of the present disclosure, the system for communicating with a low power wearable wireless device includes an aggregator, an access point, and a wearable device.

According to various embodiments of the present disclosure, the aggregator receives voice data and non-voice data, and transmits the voice data and/or non-voice data to the wearable device according to a predefined (e.g., selected) rules or communication scheme, and/or according to queries received from the wearable wireless device.

According to various embodiments of the present disclosure, the aggregator may transmit the voice data and/or non-voice data to an access point with which the wearable wireless device is in communication. Thereafter, the access point transmits the voice data and/or non-voice data to the wearable wireless device. According to various embodiments of the present disclosure, the aggregator and the access point may be integrated such that the wearable wireless device directly connects with the aggregator to transmit and receive voice data and/or non-voice data.

According to various embodiments of the present disclosure, the aggregator may reside remotely (e.g., the aggregator may be cloud-based). Alternatively, according to various embodiments of the present disclosure, the aggregator may reside locally. For example, the aggregator may be integrated with the access point device or within close proximity to the access point.

According to various embodiments of the present disclosure, the aggregator may perform information aggregation, scheduling, filtering, whitelisting and blacklisting on a user's (or wearable wireless device) voice data and non-voice data according to a user's preference settings. According to various embodiments of the present disclosure, the aggregator may transmit information to the wearable wireless device according to burst-oriented traffic patterns.

According to various embodiments of the present disclosure, the wearable wireless device may be configured to establish a plurality of connection links with the access point. For example, the connection links between the wearable wireless device and the access point may support a plurality of concurrent connections. Each of the plurality of concurrent connections between the wearable wireless device and the access point may communicate information from different data sources. The different data sources may be independent data sources. As an example, the wearable wireless device may establish a connection with the access point for voice data, and a connection with the access point for non-voice data. The wearable wireless device may establish the connection for voice data and the connection for non-voice data so as to allow for simultaneous communication (e.g., transmission/reception) of voice data and non-voice data.

According to various embodiments of the present disclosure, as a non-exhaustive illustration only, the wearable wireless device may refer to a watch, a wrist band, a lanyard, a dongle, a head-mounted display, a headset, and the like capable of wireless communication or network communication consistent with that disclosed herein.

According to various embodiments of the present disclosure, as a non-exhaustive illustration only, the access point may refer to mobile devices such as a cellular phone, a Personal Digital Assistant (PDA), a digital camera, a portable game console, and an MP3 player, a Portable/Personal Multimedia Player (PMP), a handheld e-book, a portable lap-top PC, a tablet, a Global Positioning System (GPS) navigation, and devices such as a desktop PC, a High Definition television (HDTV), a game console, an optical disc player, a set-top box, and a dedicated communication network device such as a wireless router, a wireless hub, a wireless bridge, and the like capable of wireless communication or network communication consistent with that disclosed herein.

According to various embodiments of the present disclosure, the wearable wireless device may transmit a message to at least one of an access point and an aggregator for inquiring whether the access point and/or aggregator has any pending information (e.g., a voice call, updates to subscribed services, and the like) to be transmitted to the wearable wireless device. The wearable wireless device may transmit the message using a low power wireless communication protocol. The wearable wireless device may transmit the message periodically according to a predetermined or selected schedule, and/or transmit the message according to user input (e.g., a request input by the user to update the status of a subscribed service, and the like).

According to various embodiments of the present disclosure, the aggregator may delay transmission of information to the wearable wireless device until the wearable wireless device transmits a message inquiring whether any pending information exists.

According to various embodiments of the present disclosure, the access point may communicate information with the wearable wireless device using various combinations of communication protocols. According to various embodiments of the present disclosure, the combination of communication protocols with which information is communicated between the access point and the wearable wireless device may be selected according to the type of information being communicated. For example, non data-intensive information may be communicated using a low power communication protocol. As another example, data-intensive information may be communicated using a communication protocol that differs from the low power communication protocol.

According to various embodiments of the present invention, the non data-intensive information and the data-intensive information may be characterized according to various transmission policies, or according to user preferences. For example, non data-intensive information may include Short Message Service (SMS) messages, and the like. As another example, data-intensive information may include voice data, media streaming, and the like. According to various embodiments of the present invention, the threshold for determining whether information corresponds to non data-intensive information or data-intensive information may be applied according to various transmission policies or user preferences such that the spectrum of information corresponding to non data-intensive information and the spectrum of information corresponding to data-intensive information may vary according to user (e.g., wearable wireless device), according to access point, or the like.

FIG. 1 is a diagram illustrating a system architecture for providing low power communication with a wearable device according to an exemplary embodiment of the present disclosure.

Referring to FIG. 1, the system 100 for providing low power communication with a wearable device includes an aggregator 110, an access point 120, and a wearable wireless device 130. The system 100 may also include a Voice over Internet Protocol (VoIP) server 140, a base station 150, and/or an internet or cloud-based server 160.

According to various embodiments of the present disclosure, the system 100 offloads high-power communication traffic including both voice data and non-voice data to the access point 120 which thereafter relays (e.g., transmit) the voice data and/or non-voice data to the wearable wireless device via a combination of communication links including a low-power communication link so that the total energy consumed by transmitting the voice data and/or non-voice data is lower than the energy consumed when using a non-offloading scheme to communicate the information.

The aggregator 110 may communicate with one or more access point devices 120, one or more VoIP servers 140, one or more base stations 150, one or more internet/cloud-based server 160, and the like. For example, the aggregator 110 may receive voice data and non-voice data from one or more access point devices 120, one or more VoIP servers 140, one or more base stations 150, one or more internet/cloud-based server 160, and the like. According to various embodiments of the present disclosure, the aggregator 110 may receive voice data, and/or non-voice data such as, for example, e-mails, Short Message Service (SMS) messages, Multimedia Messaging Service (MMS) messages, updates from web services such as social networking sites (e.g., FACEBOOK, TWITTER, GOOGLE+, LINKEDIN, and the like), calendar updates, weather forecasts, instant messaging, Rich Site Summary (RSS) information, multimedia (e.g., images, photos, videos, audios), and the like via a connection with the access point 120, the VoIP server 140, the base station 150, the internet/cloud-based server 160, and the like, or any combination thereof.

Upon reception of voice data and/or non-voice data, the aggregator 110 may transmit the voice data and/or voice data to the access point 120 operatively connected to an intended recipient wearable wireless device 130.

According to various embodiments of the present disclosure, the aggregator 110 may be configured to transmit the voice data and/or non-voice data to the access point 110 operatively connected to the intended recipient wearable wireless device according to a predefined or selected communication scheme. For example, the aggregator 110 may perform information aggregation, scheduling, filtering, whitelisting, blacklisting in relation to the information (e.g., received voice data and/or non-voice data), and the like, or some combination thereof. According to various embodiments of the present disclosure, the aggregator 110 may selectively perform such actions according to characteristics of the information (e.g., type of information, sender, and the like) and/or the context in which the wearable wireless device 130 operates (e.g., time, location, and the like). The aggregator 110 may selectively perform such actions according to user preferences which may be configurable by a user of the wearable wireless device 130.

According to various embodiments of the present disclosure, the aggregator 110 may aggregate information (e.g., received voice data and/or non-voice data) before relaying (e.g., transmitting) the information to the wearable wireless device 130 (e.g., operatively through the access point 120). The aggregator 110 may selectively aggregate information according to user preferences such that certain information is aggregated and other information is not aggregated (e.g., based on information characteristics, contextual characteristics of the wearable wireless device 130, and the like). After aggregating the information, the aggregator 110 may relay (e.g., transmit) the information to the access point 120 using burst-oriented traffic patterns, according to a predefined scheduling scheme, and the like.

According to various embodiments of the present disclosure, the aggregator 110 may relay (e.g., transmit) the information to the wearable wireless device 130 (e.g., operatively through the access point 120) according to predefined scheduling. The scheduling may be configured according to user preferences or according to a power optimizing scheme. For example, the aggregator 110 may relay only some information, such as, for example, voice data (e.g., a phone call) to the wearable wireless device 130 between predefined or selected times (e.g., at nighttime), while delaying transmission of other (e.g., less time sensitive) information such as, for example, e-mails, Short Message Service (SMS) messages, Multimedia Messaging Service (MMS) messages, updates from web services such as social networking sites (e.g., FACEBOOK, TWITTER, GOOGLE+, LINKEDIN, and the like), calendar updates, weather forecasts, instant messaging, Rich Site Summary (RSS) information, multimedia (e.g., mages, photos, videos, audios), and the like until a predefined or selected time (e.g., after nighttime passes). According to various embodiments of the present disclosure, the user may configure the aggregator 110 to schedule the relay of specific information and to schedule the restriction or delay relay of other information.

According to various embodiments of the present disclosure, the aggregator 110 may relay (e.g., transmit) the information to the wearable wireless device 130 (e.g., operatively through the access point 120) according to a filtering scheme. The filtering scheme may be predefined or selected/configured by the user according to the user preferences. For example, the aggregator 110 may only relay information received from certain sources (e.g., contacts, services, and/or the like) and restrict or delay the relay of information received from other sources. According to various embodiments of the present disclosure, the aggregator 110 may immediately relay information from certain sources. Further, the aggregator 110 may perform information aggregation, scheduling, filtering, whitelisting, blacklisting in relation to the information (e.g., received voice data and/or non-voice data), and the like, or some combination thereof on information from certain sources, and may perform another of aggregation, scheduling, filtering, whitelisting, blacklisting in relation to the information (e.g., received voice data and/or non-voice data), and the like, or a different combination thereof to information received from other sources. For example, the aggregator 110 may filter the information such that information from certain sources is immediately relayed to the wearable wireless device 130, and information from other sources is aggregated and transmitted in bursts, and/or according to a predefined or selected scheduling scheme.

Similarly, the aggregator 110 may apply whitelisting and/or blacklisting to the received information such that information relayed (e.g., transmitted) to the wearable wireless device 130 (e.g., operatively through the access point 120) is relayed according to a whitelist and/or blacklist accessed by the aggregator 110. The whitelist and/or the blacklist may be stored locally at the aggregator 110 or may be stored remotely on a server accessible to the aggregator 110. According to the various embodiments of the present disclosure, the whitelist and/or blacklist may be configurable. For example, the user may configure the whitelist and/or blacklist according to user preferences.

As an example, the whitelist may correspond to a list of contacts and/or services from which information may be relayed to the wearable wireless device 130. The whitelist may also identify specific types of information that may be relayed to the wearable wireless device 130. In addition, the whitelist may identify that a specific type of information from a predefined group of contacts and/or services may be relayed to the wearable wireless device 130.

In contrast, as an example, a blacklist may correspond to a list of contacts and/or services from which information may not be relayed (e.g., the relay of such information may be restricted or delayed). The blacklist may also identify specific types of information for which relay thereof may be restricted or delayed.

According to various embodiments of the present disclosure, the aggregator 110 may include a two-way communication link with the access point 120, a two-way communication link with the base station 150, a two-way communication link with the VoIP server 140, and a two-way communication link with the internet/cloud-based server 160 via an IP based communication protocol, and the like, or a combination thereof.

According to various embodiments of the present disclosure, the access point 120 may communicate with one or more aggregators 110, one or more wearable wireless device 130, one or more base stations 150, and the like, or any combination thereof.

According to various embodiments of the present disclosure, the access point 120 provides a wearable wireless device 130 with access to one or more voice data and/or non-voice data sources.

The access point 120 may include a low power radio transceiver to communicate with the wearable wireless device 130 so as to transmit/receive non data-intensive information via a low power wireless communication protocol. As an example, a low power wireless communication protocol may include Bluetooth Low Energy (BTLE), ANT/ANT+, a proprietary protocol, and the like.

The access point 120 may also include a secondary radio transceiver to communicate with the wearable wireless device 130 so as to transmit/receive data-intensive information via a secondary wireless communication protocol such as, for example, BLUETOOTH, WIFI, 2G, 3G, Long Term Evolution (LTE), and the like.

According to various embodiments of the present disclosure, the wireless communication protocol by which the access point 120 communicates non data-intensive information with the wearable wireless device 130 is different from the wireless communication protocol (e.g., the secondary wireless communication protocol) by which the access point 120 communicates data-intensive information.

The access point 120 may also include a tertiary short-range radio transceiver to communicate with the wearable wireless device 130 so as to transmit/receive data via a short range wireless communication protocol. For example, the tertiary short-range radio transceiver may communicate using Near Field Communications (NFC), Radio Frequency Identification (RFID), and the like.

According to various embodiments of the present disclosure, the wireless communication protocol (e.g., the short-range wireless communication protocol) by which the access point 120 transmits information via short-range communication is different from the wireless communication protocol by which the access point 120 communicates non data-intensive information with the wearable wireless device 130 and different from the wireless communication protocol (e.g., the secondary wireless communication protocol) by which the access point communicates data-intensive information with the wearable wireless device 130.

The access point 120 may also include a communication link (e.g., two-way communication link) with the base station 150. For example, the access point 120 may communicate with the base station 150 using a cellular communication protocol such as, for example, 2G, 3G, and LTE.

The access point 120 includes a communication link for communicating with the aggregator 110. For example, the access point 120 may communicate with the aggregator 110 using a dedicated wired or wireless communication link if the aggregator 110 resides locally with the access point 120. In contrast, if the aggregator 110 is located remotely in relation to the access point 120 (e.g., if the aggregator 110 is located in the cloud), then the access point 120 may include a radio transceiver with which the access point 120 communicates information with the aggregator 110 using an IP-based communication protocol.

According to various embodiments of the present disclosure, the access point 120 may communicate with the wearable wireless device 130 using any combination of the low power wireless communication protocol, the secondary wireless communication protocol, and the short-range communication protocol. The access point 120 may select the communication protocol with which to communicate the information with the wearable wireless device 130 according to the type of information. The access point 120 may concurrently transfer information over any combination of the three (or more) communication protocols so as to optimize the overall communication energy efficiency.

According to various embodiments of the present disclosure, the aggregator 110 and the access point 120 may be integrated such that a device provides functionality of both the aggregator 110 and the access point 120.

According to various embodiments of the present disclosure, the wearable wireless device 130 may operatively communicate information with one or more data sources so as to optimize the overall communication energy efficiency. For example, the wearable wireless device 130 may communicate with the access point 120 using a communication protocol selected according to the type of information to be communicated.

The wearable wireless device 130 may include a low power radio transceiver to communicate with the access point 120 so as to transmit/receive non data-intensive information via a low power wireless communication protocol. As an example, a low power wireless communication protocol may include BTLE, ANT/ANT+, a proprietary protocol, and the like.

The wearable wireless device 130 may also a secondary radio transceiver to communicate with the access point 120 so as to transmit/receive data-intensive information via a secondary wireless communication protocol such as, for example, BLUETOOTH, WIFI, 2G, 3G, Long Term Evolution (LTE), and the like.

The wearable wireless device 130 may also include a tertiary short-range radio transceiver to communicate with the access point 120 so as to transmit/receive data via a short range wireless communication protocol. For example, the tertiary short-range radio transceiver may communicate using Near Field Communications (NFC), Radio Frequency Identification (RFID), and the like.

According to various embodiments of the present disclosure, the wearable wireless device 130 may communicate with the access point 120 using any combination of the low power wireless communication protocol, the secondary wireless communication protocol, and the short-range communication protocol. The wearable wireless device 130 may select the communication protocol with which to communicate the information with the access point 120 according to the type of information.

In addition to communicating information with the access point 120 using a communication protocol selected according to the type of information to be communicated, the wearable wireless device 130 may employ other energy efficiency optimizing techniques.

According to various embodiments of the present disclosure, the wearable wireless device 130 may be configured to place the radio transceivers included therein (e.g., the low power radio transceiver, the secondary radio transceiver, and the tertiary short-range radio transceiver) in a hibernation or a deep sleep state. The wearable wireless device 130 may automatically place the radio transceivers included therein in the hibernation of the deep sleep state. As an example, the wearable wireless device 130 may place any combination of the radio transceivers included therein in the hibernation or the deep sleep state. The wearable wireless device 130 may power on or resume use of the transceivers upon reception of an interrupt generated by one or more always-on timers, sensors, and/or user input devices.

According to various embodiments of the present disclosure, the wearable wireless device 130 may be configured to operate the transceivers included therein using a power duty cycling scheme. For example, the wearable wireless device 130 may include one or more always-on timers that are configured (e.g., the value of which is set) according to the desired level of power duty cycling. For example, the desired level of power duty cycling may be set according to energy or performance constraints of the applications stored on the wearable wireless device 130.

According to various embodiments of the present disclosure, the wearable wireless device 130 may be configured to power on or resume use of the transceivers included therein while keeping other systems included in the wearable wireless device 130 in the hibernation or deep sleep state. For example, the wearable wireless device 130 may be configured to power on or resume use of the low power radio transceiver while keeping the other systems included in the wearable wireless device 130 in the hibernation or deep sleep state. The wearable wireless device 130 may power on or resume use of the low power radio transceiver upon reception of an interrupt generated by one or more always-on timers, sensors, and/or user input devices.

According to various embodiments of the present disclosure, the wearable wireless device 130 may transmit an inquiry to the access point 120 (or to the aggregator 110 via the access point 120) to determine whether there is any request to establish a communication session such as, for example, to receive an incoming call, to retrieve any updated information from a cloud service (e.g., a subscribed internet service), and the like. The wearable device 130 may transmit such inquiries using the low power wireless communication protocol.

According to various embodiments of the present disclosure, the VoIP server 140 may include one or more communication links (e.g., a two-way communication link) with the aggregator 130, and the base station 150. The VoIP server 140 may communicate voice data (or cellular data) with the aggregator 130 and/or the base station 150. For example, the VoIP server 140 may communicate the voice data using an IP communication protocol, a cellular communication protocol such as, for example, 2G, 3G, LTE, and the like. The VoIP server 140 may perform cellular network authentication via one or more physical or soft Subscriber Identity Modules (SIMs).

According to various embodiments of the present disclosure, the base station 150 may include one or more communication links with the aggregator 110, the access point 120, and the VoIP server 140. The base station 150 may transmit voice data and/or non-voice data to one or more of the aggregator 110, the access point 120, and the VoIP server 140. As an example, the base station 150 may communicate with the aggregator 110, the access point 120, and/or the VoIP server 140 using a wireless communication protocol such as, for example, 2G, 3G, LTE, and the like.

According to various embodiments of the present disclosure, the internet or cloud-based server 160 includes a communication link with the aggregator 110. The cloud-based server 160 may be configured to communicate non-voice data (e.g., internet data) to the wearable wireless device 130 (e.g., via the aggregator 110). The internet or cloud-based server 160 may provide a user with information relating to a service to which the user is subscribed. For example, the internet or cloud-based server 160 may transmit to the aggregator 110 e-mails, SMS messages, MMS messages, updates from web services such as social networking sites (e.g., FACEBOOK, TWITTER, GOOGLE+, LINKEDIN, and the like), calendar updates, weather forecasts, instant messaging, RSS information, multimedia (e.g., images, photos, videos, audios), and the like.

Figure 2:
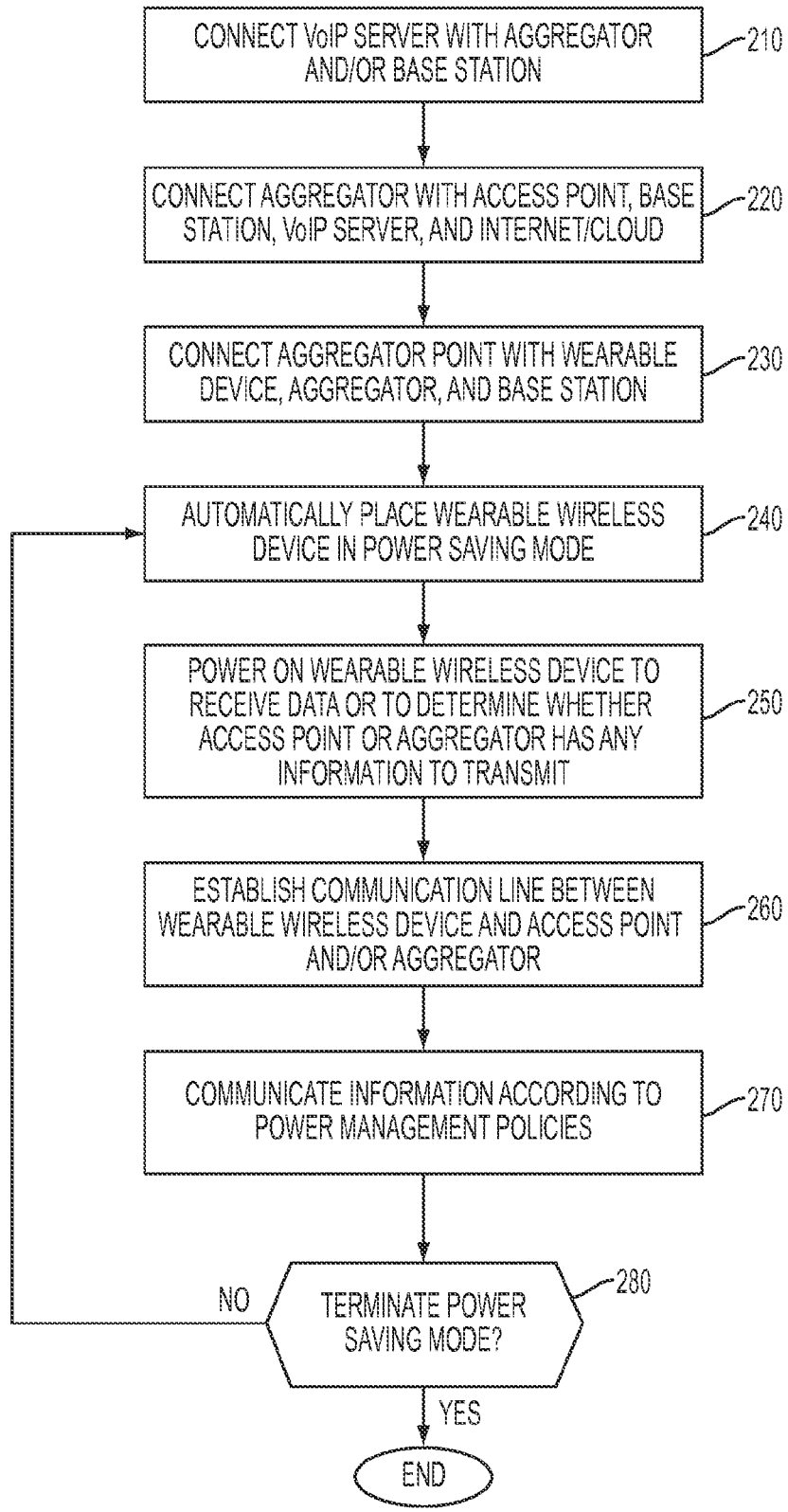
FIG. 2 is a flowchart illustrating a low power communication method for communicating with a wearable wireless device according to an exemplary embodiment of the present disclosure.

FIG. 2 is a flowchart illustrating a low power communication method for communicating with a wearable wireless device according to an exemplary embodiment of the present disclosure.

Referring to FIG. 2, at operation 210, a VoIP server is operatively connected with an aggregator and/or a base station for handling two-way cellular and internet data traffic among the VoIP server, the aggregator, and the base station, or any combination thereof.

At operation 220, the aggregator is operatively connected with an access point, the base station, the VoIP server, and/or internet or cloud, or any combination thereof for handling two-way cellular and internet data traffic among such devices. The aggregator may be configured to perform information aggregation, scheduling, filtering, whitelisting, and/or blacklisting, of any combination thereof on a user's cellular data and/or internet data according to the user's preference settings. The aggregator may be configured transmit cellular data and/or internet data using burst-oriented traffic patterns.

At operation 230, the access point is operatively connected with a wearable wireless device, the aggregator, and/or the base station, or any combination thereof for handling two-way cellular data and/or internet data among such devices.

At operation 240, the wearable wireless device is automatically placed in a power saving mode. For example, the wearable wireless device may be configured to convert to a hibernation and/or a deep sleep state. The wearable wireless device may be automatically placed in the hibernation and/or a deep sleep state. The wearable wireless device may be configured such that when the wearable wireless device is in the hibernation and/or the deep sleep state, the wearable wireless device is ready to be powered on or resumed upon receiving an interrupt generated by one or more always-on timers, sensors, and/or user input devices.

At operation 250, the wearable wireless device may power on or resume use of a low power radio transceiver while maintaining other systems in the hibernation and/or deep sleep state. The wearable wireless device may use the low power radio transceiver to receive non data-intensive information. The wearable wireless device may use the low power radio transceiver to transmit a message (e.g., an inquiry) with which the wearable wireless device queries the access point and/or aggregator to determine whether the access point and/or the aggregator has any information to be transmitted to the wearable wireless device. For example, the wearable wireless device queries the access point and/or the aggregator to determine the access point and/or the aggregator has any request to establish a communication session (e.g., to receive an incoming call or to receive any updated information from, for example, a subscribed internet service).

In response to the query from the wearable wireless device, the access point determines whether the access point has received any requests for establishing a communication session from the aggregator and/or the base station. If the access point determines that the access point has received a request for establishing a communication session, then the access point responds to the wearable wireless device by attempting to establish a communication session with the wearable wireless device. In contrast, if the access point determines that the access point has not received a request for establishing a communication session, then the access point may indicate to the wearable wireless device that no request for a communication session exists. For example, the access point may transmit an indication that the access point has no outstanding requests for a communication session with the wearable wireless device.

If wearable wireless device receives an indication that a request for a communication session exists, then the wearable wireless device powers on or resumes use of the other systems that remained in the hibernation and/or deep sleep state. For example, at operation 260, the wearable wireless device establishes at least one communication link between the wearable wireless device and the access point and/or the aggregator.

According to various embodiments of the present disclosure, the wearable wireless device may establish communication links with the access point and/or the aggregator according to power management policies. For example, the wearable wireless device may use a low power communication protocol (e.g., BTLE, ANT/ANT+, and the like) for communicating non data-intensive communications. As another example, the wearable wireless device may use a secondary communication protocol (e.g., BLUETOOTH, WIFI, 2G, 3G, LTE), which consumes more power during use relative to the low power communication protocol, for communicating data-intensive communications.

At operation 270, the wearable wireless device communicates information with the access point and/or aggregator according to power management policies. For example, the wearable wireless device may use any combination of communication protocols for transferring the information. The wearable wireless device may use the low power communication protocol and a secondary communication protocol to transfer information concurrently according to the type of information being communicated.

Thereafter, at operation 280, the wearable wireless device determines whether to terminate the power saving mode. If the wearable wireless device determines not to terminate the power saving mode at operation 280, then after the wearable wireless device has communicated the outstanding information with the access point and/or the aggregator, then the wearable wireless device returns to operation 240 at which the enters the power saving mode.

Figure 3:
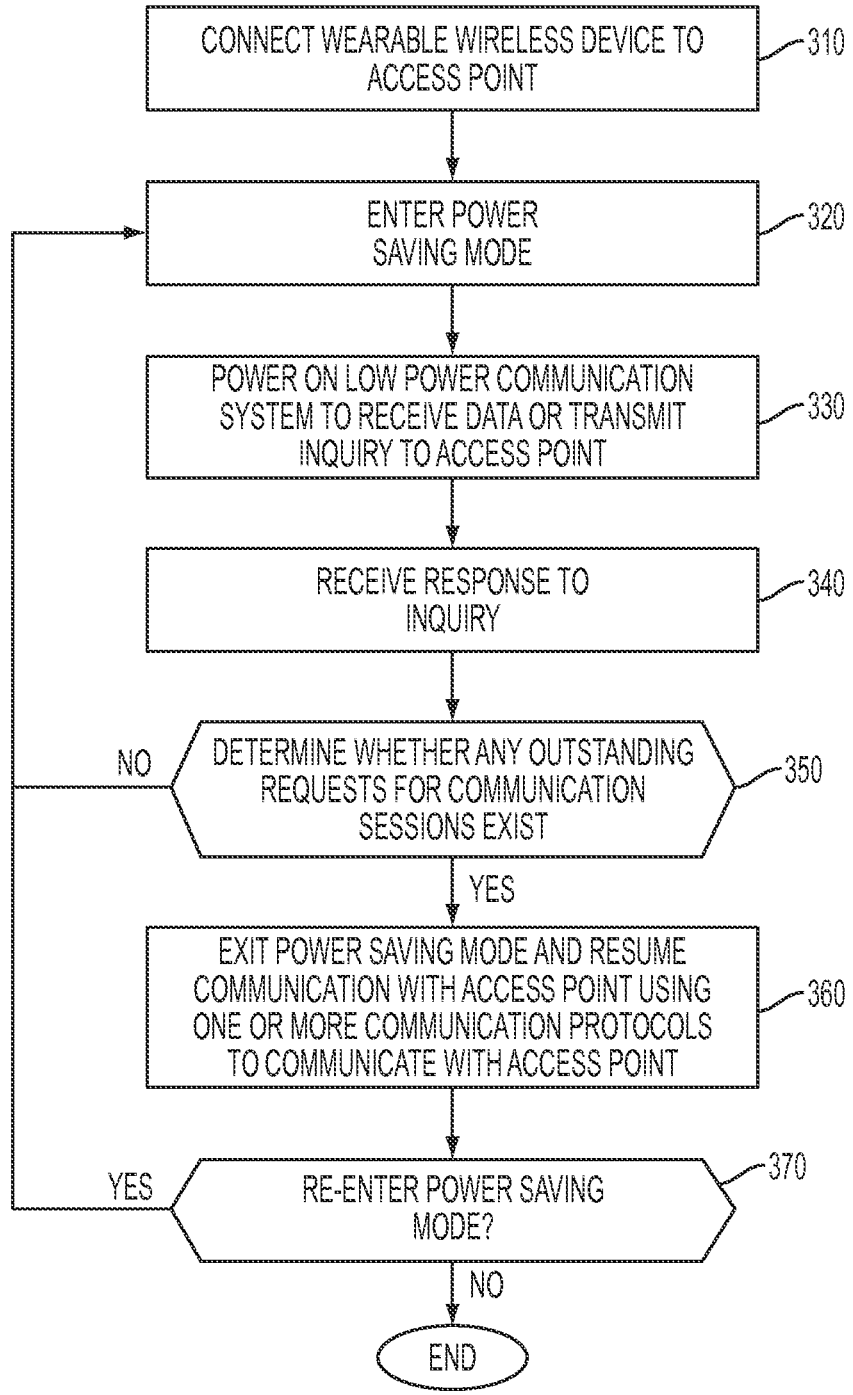
FIG. 3 is a flowchart illustrating a method of operating a wearable wireless device according to an exemplary embodiment of the present disclosure.

FIG. 3 is a flowchart illustrating a method of operating a wearable wireless device according to an exemplary embodiment of the present disclosure.

Referring to FIG. 3, at operation 310, the wearable wireless device connects to an access point for two-way communication of cellular data and/or internet data.

At operation 320, the wearable wireless device enters a power saving mode. For example, the wearable wireless device automatically places systems in a hibernation and/or deep sleep state. The wearable wireless device automatically places the wireless transceivers (e.g., radio transceivers) in the hibernation and/or deep sleep state. The wearable wireless device may be configured to power on or resume use of the wireless transceivers upon receiving an interruption generated by one or more always-on timers, sensors, and/or use input devices.

At operation 330, the wearable wireless device powers on a low power communication unit (e.g., a low power transceiver). The wearable wireless device may power on the low power communication unit while maintaining other non-essential unit (e.g., other wireless transceivers) in the hibernation and/or deep sleep state. The wearable wireless device powers on the low power communication unit to receive non data-intensive information from the access point or to transmit a message (e.g., an inquiry) to the access point with which the wearable wireless device queries the access point to determine whether any outstanding requests for a communication session exists.

At operation 340, the wearable wireless device receives a response to the inquiry that the wearable wireless device transmitted to the access point at operation 330.

At operation 350, the wearable wireless device determines whether the access point has any outstanding requests for a communication session.

If the wearable wireless device determines that the access point does not have any outstanding requests for a communication session at operation 350, then the wearable wireless device returns to operation 320 at which the wearable wireless device enters the power saving mode.

In contrast, if the wearable wireless device determines that the access point has an outstanding request for a communication session at operation 350, then the wearable wireless device proceeds to operation 360 at which the wearable wireless device exits the power saving mode and resumes communication with the access point using one or more communication protocols for such communication. For example, the wearable wireless device may communicate with the access point using one or more communication protocols according to power management policies. As an example, the wearable wireless device may communicate with the access point using one or more communication protocols according to the type of information to be communicated between the wearable wireless device and the access point. For non data-intensive information, the wearable wireless device may communicate such information using a low power communication protocol. For data intensive information, the wearable wireless device may communicate such information using a secondary wireless communication protocol (e.g., BLUETOOTH, WIFI, 2G, 3G, LTE, and the like).

Thereafter, at operation 370, the wearable wireless terminal determines whether to enter the power saving mode. For example, the wearable wireless terminal determines whether the information associated with the outstanding communication sessions are complete.

If the wearable wireless terminal determines to enter the power saving mode at operation 370, then the wearable wireless terminal returns to operation 320.

Figure 4:
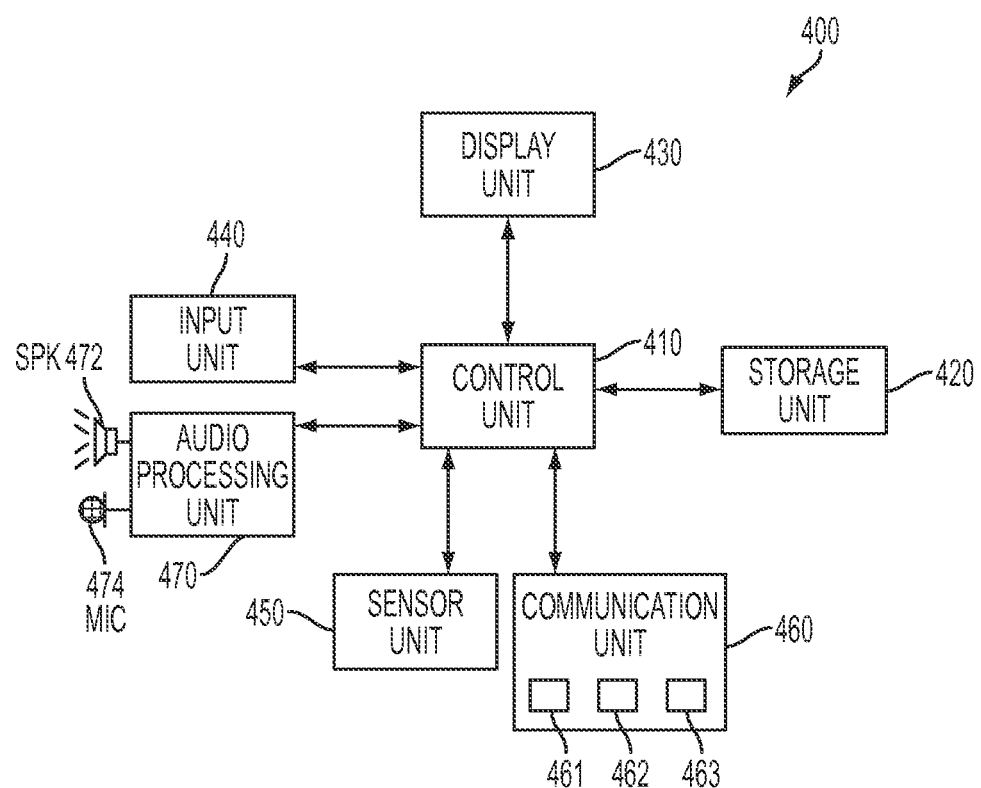
FIG. 4 is a block diagram schematically illustrating a configuration of a wearable wireless device according to an exemplary embodiment of the present disclosure.

FIG. 4 is a block diagram schematically illustrating a configuration of a wearable wireless device according to an exemplary embodiment of the present disclosure.

Referring to FIG. 4, the wearable wireless device 400 includes a control unit 410, a storage unit 420, a display unit 430, an input unit 440, and a communication unit 460. The wearable wireless device 400 may also include a sensor unit 450. The wearable wireless device 400 may also include an audio processing unit 470.

The storage unit 420 can store user data, and the like, as well a program which performs operating functions according to various embodiments of the present disclosure. For example, the storage unit 420 may store a program for controlling general operation of the wearable wireless device 400, an Operating System (OS) which boots the wearable wireless device 400, and application program for performing other optional functions such as a camera function, a sound replay function, an image or video replay function, a Near Field Communication (NFC) function, and the like. Further, the storage unit 420 may store user data generated according to a user of the wearable wireless device 400, such as, for example, a text message, a game file, a music file, a movie file, and the like. In particular, the storage unit 420 according to various embodiments of the present disclosure may store information associated with power management policies. For example, the storage unit 420 may store rules or associations relating to the operation of the wearable wireless device 400 for optimizing the energy efficiency thereof. The storage unit 420 may store information relating to which communication means (e.g., wireless transceivers, communication protocols, and the like) to use for communicating various types of data with an access point. As an example, the storage unit 420 may store information indicating that a low power communication protocol and/or low power wireless transceiver is to be used for communicating non data-intensive information with the access point, and indicating that secondary communication protocols (e.g., BLUETOOTH, 2G, 3G, LTE, and the like) and/or wireless transceivers are to be used for communicating data-intensive information.

The display unit 430 displays information inputted by user or information to be provided to user as well as various menus or user interfaces of the wearable wireless device 400. For example, the display unit 430 may provide various screens according to a use of the wearable wireless device 400, such as an idle screen, a message writing screen, a calling screen, and the like. The display unit 430 may display an interface which the user may manipulate or otherwise enter inputs via a touch screen to enter selection of the data that may be transferred or selection of devices to which the data may be transferred. The display unit 430 can be formed as a Liquid Crystal Display (LCD), an Organic Light Emitting Diode (OLED), an Active Matrix Organic Light Emitting Diode (AMOLED), and the like. However, various embodiments of the present disclosure are not limited to these examples. Further, the display unit 430 can perform the function of the input unit 440 if the display unit 430 is formed as a touch screen.

The input unit 440 may include input keys and function keys for receiving user input. For example, the input unit 440 may include input keys and function keys for receiving an input of numbers or various sets of letter information, setting various functions, and controlling functions of the wearable wireless device 400. For example, the input unit 440 may include a calling key for requesting a voice call, a video call request key for requesting a video call, a termination key for requesting termination of a voice call or a video call, a volume key for adjusting output volume of an audio signal, a direction key, and the like. In particular, the input unit 440 according to various embodiments of the present disclosure may transmit to the control unit 410 signals related to selection of data to transfer and/or selection of devices to which the data may be transferred, and signals related to operation of the wearable wireless device 400. Such an input unit 440 may be formed by one or a combination of input means such as a touch pad, a touch-screen, a button-type key pad, a joystick, a wheel key, and the like.

The audio processing unit 470 may be formed as an acoustic component. The audio processing unit 470 transmits and receives audio signals, and encodes and decodes the audio signals. For example, the audio processing unit 470 may include a CODEC and an audio amplifier. The audio processing unit 470 is connected to a Speaker (SPK) 472 and a Microphone (MIC) 474. The audio processing unit 470 converts analog voice signals inputted from the MIC into digital voice signals, generates corresponding data for the digital voice signals, and transmits the data to the control unit 410. Further, the audio processing unit 470 converts digital voice signals inputted from the control unit 410 into analog voice signals, and outputs the analog voice signals through the SPK 472. Further, the audio processing unit 470 may output various audio signals generated in the wearable wireless device 400 through the SPK 472. For example, the audio processing unit 470 can output audio signals according to an audio file (e.g., MP3 file) replay, a moving picture file replay, and the like through the SPK. In particular, according to various embodiments of the present disclosure, the audio processing unit 470 may receive an audio input (e.g., an audio command corresponding to a requested command from the user) through the MIC 474. According to exemplary embodiments of the present invention, the audio processing unit 470 may be operatively coupled to another input unit through which audio signals may be input. For example, the audio processing unit 470 may be operatively coupled to a BLUETOOTH accessory (e.g., a BLUETOOTH headset, a BLUETOOTH microphone, etc.) and the like.

The sensor unit 450 may include at least one sensor. The at least one sensor may detect and/or monitor a movement or change in position of the wearable wireless device 400. As an example, the at least one sensor may include a gyroscope, an accelerometer, a magnetometer, a barometer, a GPS sensor, an ambient light sensor, a temperature sensor, a galvanic sensor, a heart rate sensor, an optical blood flow sensor, and the like. The sensor unit 450 may provide various information to the control unit 410 with which the control unit 410 may determine a context within which the wearable wireless device 400 operates.

The communication unit 460 may be configured for communicating with other devices. For example, the communication unit 460 may be configured to communicate using various communication protocols and various communication transceivers. For example, the communication unit 460 may communicate with other devices using a low power communication protocol such as, for example, BTLE, ANT/ANT+, and the like. The communication unit 460 may communicate with other devices using a secondary communication protocol which uses more power to communicate than the low power communication protocol. As an example, the secondary communication protocol may include BLUETOOTH, WIFI, 2G, 3G, LTE, and the like. Further, the communication unit 460 may communicate with other devices using a tertiary short-range communication protocol. For example, the tertiary short-range communication protocol may include NFC, RFID, and the like.

According to various embodiments of the present disclosure, the communication unit 460 may be configured to communicate with an access point. The communication unit 460 may communicate with the access point using one or more communication protocols. For example, according to various embodiments of the present disclosure, the communication unit 460 may selectively use a communication protocol according to the type of information being communicated between the wearable wireless device 400 and the access point, or otherwise according to a power management profile for improving (e.g., optimizing) energy efficiency of the wearable wireless device 400. The communication 460 unit may use a low power communication means and/or protocol for communicating non data-intensive information and the like. The communication unit 460 may use a secondary communication means and/or protocol for communicating data intensive information and the like.

According to various embodiments of the present disclosure, the communication unit 460 may include one or more communication transceivers each of which may be configured to communicate using one or more communication protocols. For example, the communication unit 460 may include a low power radio transceiver 461, a secondary radio transceiver 462, and a tertiary short-range radio transceiver 463.

The low power radio transceiver 461 may configured to transmit and receive non data-intensive information. For example, the low radio transceiver may be configured to transmit and receive the non data-intensive information using a low power communication protocol. The low power communication protocol may correspond to a protocol that uses relatively little power during communication. For example, the low power communication protocol may be optimized for energy efficiency or otherwise designed with an important design consideration being energy efficiency. A low power communication protocol may be BLTE, ANT/ANT+, and the like.

The secondary radio transceiver 462 may be configured to transmit and receive data-intensive information. For example, the secondary radio transceiver 462 may be configured to transmit and receive the data-intensive information using a communication protocol such as, for example, BLUETOOTH, WIFI, 2G, 3G, LTE, and the like. As an example, the secondary radio transceiver 462 may be configured to use a communication protocol which is designed such that energy efficiency during communication is not a primary consideration; primary considerations may include speed of data transfer, and the like. According to various embodiments of the present disclosure, the communication protocol used by the secondary radio transceiver 462 is different than the communication protocol being used by the low power radio transceiver 461.

The tertiary short-range radio transceiver 463 may be configured to transmit information using a short-range wireless communication protocol. For example, the short-range wireless communication protocol may be NFC, RFID, and the like. According to various embodiments of the present disclosure, the communication protocol used by the tertiary short-range radio transceiver 463 is different than the communication protocol being used by the low power radio transceiver 461, and the communication protocol being used by the secondary radio transceiver 462.

According to various embodiments of the present disclosure, the communication unit 460 may use the low power radio transceiver 461, the secondary radio transceiver 462, and tertiary short-range radio transceiver 463, or any combination thereof to transmit information. For example, the communication unit 460 may use such transceivers so as to optimize the overall communication energy efficiency. The communication unit 460 may use the low power radio transceiver 461, the secondary radio transceiver 462, and tertiary short-range radio transceiver 463, or any combination thereof, concurrently to transmit information (e.g., to the access point).

According to various embodiments of the present disclosure, the wearable wireless device 400 may also include a camera unit (not shown). The camera unit may be configured to capture camera images. For example, the camera unit may capture preview images, still images, and video images. The camera unit may be controlled by the control unit 410. Such control may be based on user input through a camera application loaded on the wearable wireless device 400.

According to various embodiments of the present disclosure, the wearable wireless device 400 comprises at least one control unit 410. The at least one control unit 410 may be configured to operatively control the wearable wireless device 400. For example, the control unit 410 may control operation of the various components or units included in the wearable wireless device 400. The control unit 410 may transmit a signal to the various components included in the wearable wireless device 400 and control a signal flow between internal blocks of the wearable wireless device 400. In particular, the control unit 410 according to various embodiments of the present disclosure may control the wearable wireless device 400 so as to operate in an energy efficient manner. For example, the control unit 410 may control the communication unit 460 so as to selectively use various communication protocols according to the information being transmitted and/or the context in which the wearable wireless device 400 operates, and the like.

According to various embodiments of the present disclosure, the control unit 410 may control the wearable wireless device 400 to enter a power saving mode (e.g., when the wearable wireless device 400 is not transmitting information with, for example, an access point). The control unit 410 may control to place the communication unit 460 in hibernation and/or a deep sleep state when the wearable wireless device 400 enters the power saving mode. The control unit 410 may control to activate (e.g., power on or resume use of) the low power radio transceiver 461 to query the access point as to whether the access point has any outstanding communication session requests for communicating information to the wearable wireless device 400. For example, the control unit 410 may control to activate the low power radio transceiver 461 upon receiving an interrupt generated by one or more always-on timers, sensors, and/or user input devices. The control unit 410 may control to set values of timers according to the desired level of power duty cycling given energy/performance constraints set by applications being used or according to user preferences. The control unit 410 may control to awaken the wearable wireless device 400 (e.g., exit the power saving mode) when the control unit 410 determines that the access point has outstanding communication session requests (or otherwise has information to transmit to the wearable wireless device 400). The control unit 410 may control to manage communication with access point so as to selectively use various communication protocols according to power management policies.

Figure 5:
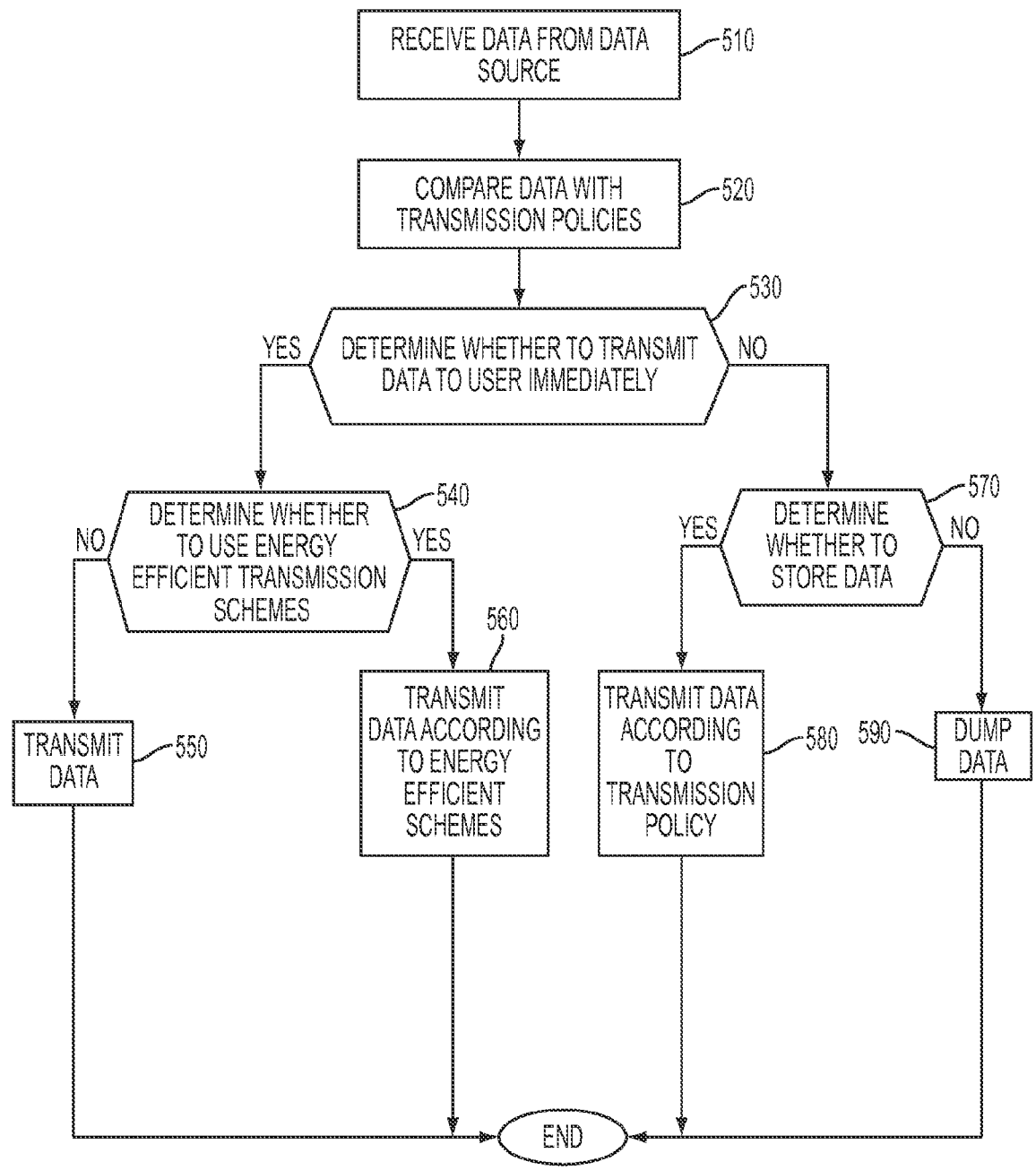
FIG. 5 is a flowchart illustrating a method of operating an aggregator according to an exemplary embodiment of the present disclosure.

FIG. 5 is a flowchart illustrating a method of operating an aggregator according to an exemplary embodiment of the present disclosure.

Referring to FIG. 5, at operation 510, the aggregator receives data from a data source. For example, the data may be cellular data, internet data, and the like. The aggregator may operatively receive the data from a VoIP server, a base station, the Internet (e.g., a web-based or cloud-based server), and the like.

At operation 520, the aggregator compares the received data with transmission policies according to which the aggregator transmits information to users. The transmission policies may be stored locally or remotely, and may be configurable by a service or a user. The transmission policies may include, for example, performing information aggregation, scheduling, filtering, whitelisting, blacklisting, and the like.

At operation 530, the aggregator determines whether to immediately transmit the received data (or a portion thereof) to the user (e.g., using the wearable wireless device). For example, the aggregator may determine that voice data from a specific contact (e.g., a contact provided on a whitelist), or an emergency call should be immediately transmitted to the user. As another example, the aggregator may determine that all incoming calls, SMS messages, MMS messages, and the like should be transmitted to the user upon receipt of the associated data by the aggregator. As another example, the aggregator may determine that internet data such as, for example, an email, an update from a social networking site, and the like should not be immediately transmitted to the user (e.g., transmission of such data may be delayed or restricted).

According to various embodiments of the present invention, the aggregator may adopt a context-aware policy in addition to the transmission policy according to the type of information received (e.g., a call, a social update, and the like), in order to determine whether to immediately transmit the received data to the user. For example, such a context aware policy may consider a user's schedule (e.g., day of the week, time of the day, scheduled meetings, or the like), a user's location (e.g., the home, the office, or the like), a user's activity (e.g., driving), a sender of the information (e.g., family, friends, colleagues, or the like), location of the sender (e.g., a message from a sender who is listed as a contact in the user's terminal and who is located at the same location as the user may be immediately transmitted to the user), and/or the like. Accordingly, the aggregator may take into account the context of the user and/or terminal when determining whether to immediately transmit information or whether to delay or restrict transmission of such information.

According to various embodiments of the present invention, the aggregator may take into account a change in the context of the user and/or terminal when determining whether to immediately transmit information or whether to delay or restrict transmission of such information.

If the aggregator determines that the received data (or a portion thereof) should be immediately transmitted to the user at operation 530, then the aggregator proceeds to operation 540 at which the aggregator determines whether to use an energy efficient transmission scheme. For example, the aggregator may determine whether a burst oriented transmission should be used.

If the aggregator determines that the aggregator should not use (or is otherwise unnecessary to use) an energy efficient transmission scheme to transmit the information to be transmitted to the user immediately at operation 530, then the aggregator proceeds to operation 550 at which the aggregator transmits the data to the user (e.g., to the wearable wireless device).

In contrast, if the aggregator determines that the aggregator should use an energy efficient transmission scheme to transmit the information to be transmitted to the user immediately at operation 530, then the aggregator proceeds to operation 560 at which the aggregator transmits the data to the user according to a selected energy efficient transmission schemes.

In contrast, if the aggregator determines not to immediately transmit the data to the user at operation 530, then the aggregator proceeds to operation 570 at which the aggregator determines whether to store the data (e.g., until transmission is appropriate according to the applicable transmission policies).

In contrast, if the aggregator determines to store the data at operation 570, then the aggregator proceeds to operation 580 at which the aggregator stores the data and transmits the data to the user (e.g., to the wearable wireless device) according to applicable transmission policies. For example, the aggregator may apply an information aggregation transmission policy according to which the aggregator transmits the information to the user when a predetermined time duration has lapsed or upon aggregated data intended for the user meets or exceeds an aggregate size threshold. As another example, the aggregator may apply a transmission policy according to which the aggregator transmits the information upon receiving a request from the user to transmit information thereto (e.g., the aggregator stores the data until the user pulls the data thereto). As another example, the aggregator may apply a transmission policy according to which the aggregator transmits the information upon receiving an override request from the application or cloud service generating the stored information. Such an application and/or cloud service may also embed such an overriding request in the metadata section of the delivered information via which the adjusted priority of the said information (e.g., from stored and delivery to immediate delivery) will persist until the next priority adjustment occurs. As another example, the aggregator may apply a transmission policy according to which the aggregator transmits the information upon receiving a request from the access point and/or the wearable device detecting a change of user's location, activity, and/or state.

In contrast, if the aggregator determines not to store the data at operation 570, then the aggregator proceeds to operation 590 at which the aggregator dumps the data not to be stored. As an example, the aggregator may determine not to store data for transmission to the user if the data is of a type which the user is unable to view/use on the wearable wireless device, if the data exceeds a certain size threshold, if the data corresponds to services (and updates thereof) which the user does not wish to receive on the wearable wireless device, if the data corresponds to data on a blacklist, and the like.

Figure 6:
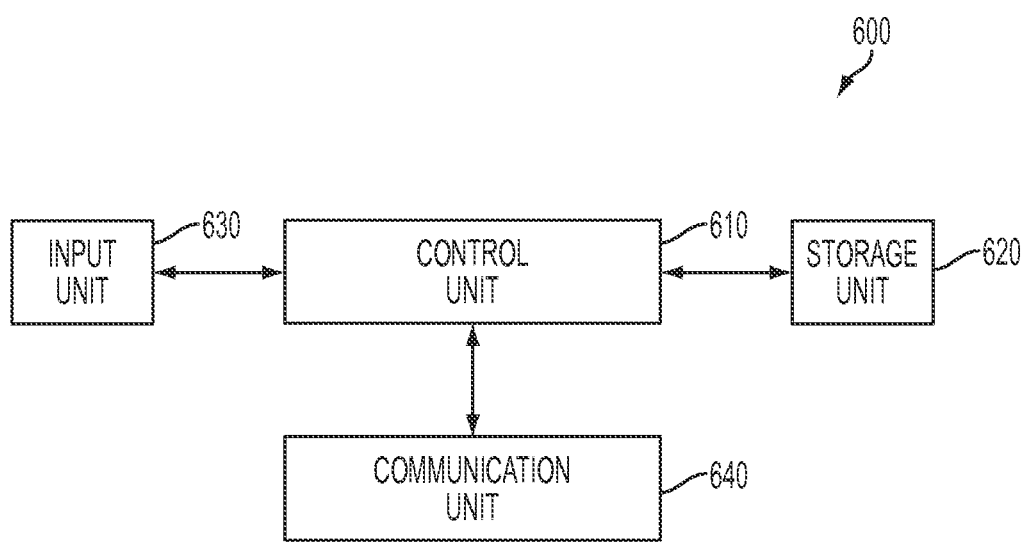
FIG. 6 is a block diagram schematically illustrating a configuration of an aggregator according to an exemplary embodiment of the present disclosure.

FIG. 6 is a block diagram schematically illustrating a configuration of an aggregator according to an exemplary embodiment of the present disclosure.

Referring to FIG. 6, the aggregator 600 includes a control unit 610, a storage unit 620, and a communication unit 640. According to various embodiments of the present disclosure, the aggregator 600 may also include an input unit 630.

The storage unit 620 can store user data, and the like, as well a program which performs operating functions according to various embodiments of the present disclosure. For example, the storage unit 620 may store a program for controlling general operation of the aggregator 600, an Operating System (OS) which boots the aggregator 600, and application program for performing other optional functions. For example, the storage unit 620 may store rules or associations relating to the operation of the aggregator 600 for optimizing the energy efficiency associated with transmission of data to the user. The storage unit 620 may store information relating to which communication means (e.g., wireless transceivers, communication protocols, and the like) to use for communicating various types of data to the wearable wireless device. As an example, the storage unit 620 may store information indicating that a low power communication protocol and/or low power wireless transceiver is to be used for communicating non data-intensive information with the wearable wireless device, and indicating that secondary communication protocols (e.g., BLUETOOTH, 2G, 3G, LTE, and the like) and/or wireless transceivers are to be used for communicating data-intensive information.

According to various embodiments of the present disclosure, the storage unit 620 may store transmission policies according to which the aggregator 600 transmits received data. For example, the transmission policies may relate to applying information aggregation, scheduling, filtering, whitelisting, and blacklisting and the like on a user's cellular and/or internet data, and the like.

The communication unit 640 may be configured for communicating with other devices. For example, the communication unit 640 may be configured to communicate using various communication protocols and various communication transceivers. For example, the communication unit 640 may communicate with other devices using a low power communication protocol such as, for example, BTLE, ANT/ANT+, and the like. The communication unit 640 may communicate with other devices using a secondary communication protocol which uses more power to communicate than the low power communication protocol. As an example, the secondary communication protocol may include BLUETOOTH, WIFI, 2G, 3G, LTE, and the like. Further, the communication unit 640 may communicate with other devices using a tertiary short-range communication protocol. For example, the tertiary short-range communication protocol may include NFC, RFID, and the like.

According to various embodiments of the present disclosure, the communication unit 640 may be configured to communicate with an access point, a base station, a VoIP server, the internet (e.g., a web-based or cloud-based server), and a wearable wireless device (e.g., if the aggregator and access point are integrated).

According to various embodiments of the present disclosure, if the aggregator 600 is integrated with (or also serves as) an access point, then the communication unit 640 may communicate with the wearable wireless device using one or more communication protocols. For example, according to various embodiments of the present disclosure, the communication unit 640 may selectively use a communication protocol according to the type of information being communicated between the wearable wireless device and the aggregator 600, or otherwise according to a transmission policy for improving (e.g., optimizing) energy efficiency of transmission with the wearable wireless device. The communication 640 unit may use a low power communication means and/or protocol for communicating non data-intensive information and the like. The communication unit 640 may use a secondary communication means and/or protocol for communicating data intensive information and the like.

According to various embodiments of the present disclosure, the communication unit 640 may include one or more communication transceivers each of which may be configured to communicate using one or more communication protocols. For example, the communication unit 640 may include a low power radio transceiver, a secondary radio transceiver, and a tertiary short range radio transceiver.

The low power radio transceiver may be configured to transmit and receive non data-intensive information. For example, the low radio transceiver may be configured to transmit and receive the non data-intensive information using a low power communication protocol. The low power communication protocol may correspond to a protocol that uses relatively little power during communication. For example, the low power communication protocol may be optimized for energy efficiency or otherwise designed with an important design consideration being energy efficiency. A low power communication protocol may be BLTE, ANT/ANT+, and the like.

The secondary radio transceiver may be configured to transmit and receive data-intensive information. For example, the secondary radio transceiver may be configured to transmit and receive the data-intensive information using a communication protocol such as, for example, BLUETOOTH, WIFI, 2G, 3G, LTE, and the like. As an example, the secondary radio transceiver may be configured to use a communication protocol which is designed such that energy efficiency during communication is not a primary consideration; primary considerations may include speed of data transfer, and the like. According to various embodiments of the present disclosure, the communication protocol used by the secondary radio transceiver is different than the communication protocol being used by the low power radio transceiver.

The tertiary short-range radio transceiver may be configured to transmit information using a short-range wireless communication protocol. For example, the short-range wireless communication protocol may be NFC, RFID, and the like. According to various embodiments of the present disclosure, the communication protocol used by the tertiary short-range radio transceiver is different than the communication protocol being used by the low power radio transceiver 461, and the communication protocol being used by the secondary radio transceiver 462.

According to various embodiments of the present disclosure, the communication unit 640 may use the low power radio transceiver, the secondary radio transceiver, and tertiary short-range radio transceiver, or any combination thereof to transmit information. For example, the communication unit may use such transceivers so as to optimize the overall communication energy efficiency of transmissions with the wearable wireless device. The communication unit 640 may use the low power radio transceiver, the secondary radio transceiver, and tertiary short-range radio transceiver, or any combination thereof, concurrently to transmit information (e.g., to the wearable wireless device).

The input unit 630 may include input keys and function keys for receiving user input. For example, the input unit 630 may include input keys and function keys for receiving an input of numbers or various sets of letter information, setting various functions, and controlling functions of the aggregator 600. Such an input unit 630 may be formed by one or a combination of input means such as a touch pad, a touchscreen, a button-type key pad, a joystick, a wheel key, and the like.

According to various embodiments of the present disclosure, the aggregator 600 comprises at least one control unit 610. The at least one control unit 610 may be configured to operatively control the aggregator 600. For example, the control unit 610 may control operation of the various components or units included in the aggregator 600. The control unit 610 may transmit a signal to the various components included in the aggregator 600 and control a signal flow between internal blocks of the aggregator 600. In particular, the control unit 610 according to various embodiments of the present disclosure may control the aggregator 600 so as to transmit data to a user (e.g., a wearable wireless device) in an energy efficient manner. For example, the control unit 610 may control the communication unit 640 so as to selectively use various communication protocols according to the information being transmitted and/or the context in which the wearable wireless device operates, and the like.

According to various embodiments of the present disclosure, the control unit 610 may control to transmit data to a user according to one or more predefined or selected transmission policies.

Figure 7:
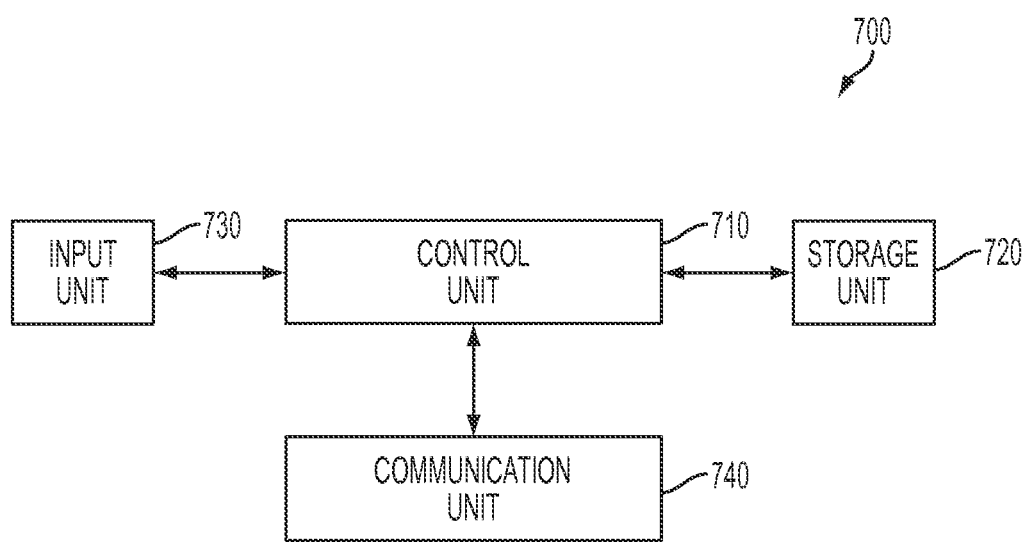
FIG. 7 is a block diagram schematically illustrating a configuration of an access point according to an exemplary embodiment of the present disclosure.

FIG. 7 is a block diagram schematically illustrating a configuration of an access point according to an exemplary embodiment of the present disclosure.

Referring to FIG. 7, the access point 700 includes a control unit 710, a storage unit 720, and a communication unit 740. According to various embodiments of the present disclosure, the access point 700 may also include an input unit 730.

The storage unit 720 can store user data, and the like, as well a program which performs operating functions according to various embodiments of the present disclosure. For example, the storage unit 720 may store a program for controlling general operation of the access point 700, an OS which boots the access point 700, and an application program for performing other optional functions. For example, the storage unit 720 may store rules or associations relating to the operation of the access point 700 for optimizing the energy efficiency associated with transmission of data to the user (e.g., the wearable wireless device). The storage unit 720 may store information relating to which communication means (e.g., wireless transceivers, communication protocols, and the like) to use for communicating various types of data to the wearable wireless device. As an example, the storage unit 720 may store information indicating that a low power communication protocol and/or low power wireless transceiver is to be used for communicating non data-intensive information with the wearable wireless device, and indicating that secondary communication protocols (e.g., BLUETOOTH, 2G, 3G, LTE, and the like) and/or wireless transceivers are to be used for communicating data-intensive information.

According to various embodiments of the present disclosure, the storage unit 720 may store transmission policies according to which the access point 700 transmits received data. For example, the transmission policies may relate to applying information aggregation, scheduling, filtering, whitelisting, and blacklisting and the like on a user's cellular and/or internet data, and the like.

The communication unit 740 may be configured for communicating with other devices. For example, the communication unit 740 may be configured to communicate using various communication protocols and various communication transceivers. For example, the communication unit 740 may communicate with other devices using a low power communication protocol such as, for example, BTLE, ANT/ANT+, and the like. The communication unit 740 may communicate with other devices using a secondary communication protocol which uses more power to communicate than the low power communication protocol. As an example, the secondary communication protocol may include BLUETOOTH, WIFI, 2G, 3G, LTE, and the like. Further, the communication unit 740 may communicate with other devices using a tertiary short-range communication protocol. For example, the tertiary short-range communication protocol may include NFC, RFID, and the like.

According to various embodiments of the present disclosure, the communication unit 740 may be configured to communicate with an aggregator, a base station, a VoIP server, the internet (e.g., a web-based or cloud-based server), and a wearable wireless device.

According to various embodiments of the present disclosure, the communication unit 740 may communicate with the wearable wireless device using one or more communication protocols. The communication unit 740 may communicate with the wearable wireless device using one or more communication protocols concurrently. For example, according to various embodiments of the present disclosure, the communication unit 740 may selectively use a communication protocol according to the type of information being communicated between the wearable wireless device and the access point 700, or otherwise according to a transmission policy for improving (e.g., optimizing) energy efficiency of transmission with the wearable wireless device. The communication 740 unit may use a low power communication means and/or protocol for communicating non data-intensive information and the like. The communication unit 740 may use a secondary communication means and/or protocol for communicating data intensive information and the like.

According to various embodiments of the present disclosure, the communication unit 740 may include one or more communication transceivers each of which may be configured to communicate using one or more communication protocols. For example, the communication unit 740 may include a low power radio transceiver, a secondary radio transceiver, and a tertiary short range radio transceiver.

The low power radio transceiver may be configured to transmit and receive non data-intensive information. For example, the low radio transceiver may be configured to transmit and receive the non data-intensive information using a low power communication protocol. The low power communication protocol may correspond to a protocol that uses relatively little power during communication. For example, the low power communication protocol may be optimized for energy efficiency or otherwise designed with an important design consideration being energy efficiency. A low power communication protocol may be BLTE, ANT/ANT+, and the like.

The secondary radio transceiver may be configured to transmit and receive data-intensive information. For example, the secondary radio transceiver may be configured to transmit and receive the data-intensive information using a communication protocol such as, for example, BLUETOOTH, WIFI, 2G, 3G, LTE, and the like. As an example, the secondary radio transceiver may be configured to use a communication protocol which is designed such that energy efficiency during communication is not a primary consideration; primary considerations may include speed of data transfer, and the like. According to various embodiments of the present disclosure, the communication protocol used by the secondary radio transceiver is different than the communication protocol being used by the low power radio transceiver.

The tertiary short-range radio transceiver may be configured to transmit information using a short-range wireless communication protocol. For example, the short-range wireless communication protocol may be NFC, RFID, and the like. According to various embodiments of the present disclosure, the communication protocol used by the tertiary short-range radio transceiver is different than the communication protocol being used by the low power radio transceiver, and the communication protocol being used by the secondary radio transceiver.

According to various embodiments of the present disclosure, the communication unit 740 may use the low power radio transceiver, the secondary radio transceiver, and tertiary short-range radio transceiver, or any combination thereof to transmit information. For example, the communication unit may use such transceivers so as to optimize the overall communication energy efficiency of transmissions with the wearable wireless device. The communication unit 740 may use the low power radio transceiver, the secondary radio transceiver, and tertiary short-range radio transceiver, or any combination thereof, concurrently to transmit information (e.g., to the wearable wireless device).

The input unit 730 may include input keys and function keys for receiving user input. For example, the input unit 730 may include input keys and function keys for receiving an input of numbers or various sets of letter information, setting various functions, and controlling functions of the access point 700. Such an input unit 730 may be formed by one or a combination of input means such as a touch pad, a touchscreen, a button-type key pad, a joystick, a wheel key, and the like.

According to various embodiments of the present disclosure, the access point 700 comprises at least one control unit 710. The control unit 710 may be configured to operatively control the access point 700. For example, the control unit 710 may control operation of the various components or units included in the access point 700. The control unit 710 may transmit a signal to the various components included in the access point 700 and control a signal flow between internal blocks of the access point 700. In particular, the control unit 710 according to various embodiments of the present disclosure may control the access point 700 so as to transmit data to a user (e.g., a wearable wireless device) in an energy efficient manner. For example, the control unit 710 may control the communication unit 740 so as to selectively use various communication protocols according to the information being transmitted and/or the context in which the wearable wireless device operates, and the like.

According to various embodiments of the present disclosure, the control unit 710 may control to transmit data to a user according to one or more predefined or selected transmission policies.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an aggregator to transmit information to a wearable device, the method comprising:
   receiving information from at least one data source;
   selecting a transmission policy according to which the information is to be transmitted to the wearable device based on preference settings of the wearable device; and
   transmitting the information to the wearable device according to the selected transmission policy,
   wherein the selected transmission policy includes aggregating applicable received information and transmitting the applicable received information upon detection of a change in context in which the wearable device operates.

2. The method of claim 1, wherein the selecting of the transmission policy comprises selecting at least one transmission policy according to which the information is to be transmitted to the wearable device, the at least one transmission policy selected from:
   an information aggregation transmission policy;
   a scheduling transmission policy;
   a filtering transmission policy;
   a whitelist transmission policy; and
   a blacklist transmission policy.

3. The method of claim 2, wherein, if the selected at least one transmission policy includes the information aggregation policy, then the aggregator aggregates applicable received information and transmits the aggregated information when a size of the aggregated information exceeds a selected size threshold.

4. The method of claim 2, wherein, if the selected at least one transmission policy includes the information scheduling policy, then the aggregator aggregates applicable received information and transmits the aggregated information according to a selected schedule.

5. The method of claim 2, wherein, if the selected at least one transmission policy includes the information filtering policy, then the aggregator filters the received information and applies a different transmission policy to each of the various filtered information.

6. The method of claim 1, wherein the selected transmission policy includes aggregating applicable received information until the aggregator receives a request for transmission of such information from the wearable device.

7. The method of claim 1, wherein the change in context in which the wearable device operates comprises at least one of:
   a change in the wearable device's location;
   a change in the wearable device's activity; and
   a change in a state of at least one of the wearable device and a terminal.

8. The method of claim 1, further comprising:
   receiving a request to change the selected transmission policy.

9. The method of claim 8, wherein the request to change the selected transmission policy is included in a metadata section of information received from the at least one data source.

10. The method of claim 9, wherein the request to change the selected transmission policy corresponds to a request to temporarily change the selected transmission policy for applicable information identified in the request to change the selected transmission policy.

11. The method of claim 1, wherein the aggregator transmits voice data and non-voice data according to different transmission policies.

12. The method of claim 11,
   wherein the aggregator immediately transmits voice data to the wearable device, and
   wherein the aggregator stores non-voice data and transmits the non-voice data according to an applicable transmission policy.

13. The method of claim 12, wherein the transmission policy applicable to non-voice data includes waiting for the wearable device to request transmission of the non-voice data.

14. An apparatus for transmitting information to a wearable device, the device comprising:
   a transceiver configured to:
      receive information from at least one data source, and
      transmit the received information to the wearable device;
   a storage unit configured to store the received information; and
   a control unit configured to:
      select a transmission policy according to which the information is to be transmitted to the wearable device based on preference settings of the wearable device, and
      operatively control the transceiver to transmit the information to the wearable device according to the selected transmission policy,
   wherein the selected transmission policy includes aggregating applicable received information and transmitting the applicable received information upon detection of a change in context in which the wearable device operates.

15. The apparatus of claim 14, wherein the control unit is further configured to select at least one transmission policy according to which the information is to be transmitted to the wearable device, the at least one transmission policy selected from:
   an information aggregation transmission policy;
   a scheduling transmission policy;
   a filtering transmission policy;
   a whitelist transmission policy; and
   a blacklist transmission policy.

16. The apparatus of claim 15, wherein, if the selected at least one transmission policy includes the information aggregation policy, then the control unit is further configured to:
   aggregate applicable received information; and
   operatively transmit the aggregated information when a size of the aggregated information exceeds a selected size threshold.

17. The apparatus of claim 16, wherein, if the selected at least one transmission policy includes the information scheduling policy, then the control unit is further configured to:
   aggregate applicable received information; and
   operatively transmits the aggregated information according to a selected schedule.

18. The apparatus of claim 16, wherein, if the selected at least one transmission policy includes the information filtering policy, then the control unit is further configured to:
   filter the received information; and
   apply a different transmission policy to each of the various filtered information.

19. The apparatus of claim 14, wherein the selected transmission policy includes aggregating applicable received information until the control unit receives a request for transmission of such information from the wearable device.

20. The apparatus of claim 14, wherein the change in context in which the wearable device operates comprises at least one of:
   a change in the wearable device's location;
   a change in the wearable device's activity; and
   a change in a state of at least one of the wearable device and a terminal.

21. The apparatus of claim 14, wherein the control unit is further configured to receive a request to change the selected transmission policy.

22. The apparatus of claim 21, wherein the request to change the selected transmission policy is included in a metadata section of information received from the at least one data source.

23. The apparatus of claim 22, wherein the request to change the selected transmission policy corresponds to a request to temporarily change the selected transmission policy for applicable information identified in the request to change the selected transmission policy.

24. The apparatus of claim 16, wherein the control unit is further configured to control transmission of voice data and transmission of non-voice data according to different transmission policies.

25. The apparatus of claim 16, wherein the control unit is further configured to:
   immediately transmit voice data to the wearable device, and
   control to store non-voice data and transmit the non-voice data according to an applicable transmission policy.

26. The apparatus of claim 25, wherein the transmission policy applicable to non-voice data includes waiting for the wearable device to request transmission of the non-voice data.

* * * * *